UNITED STATES PATENT OFFICE.

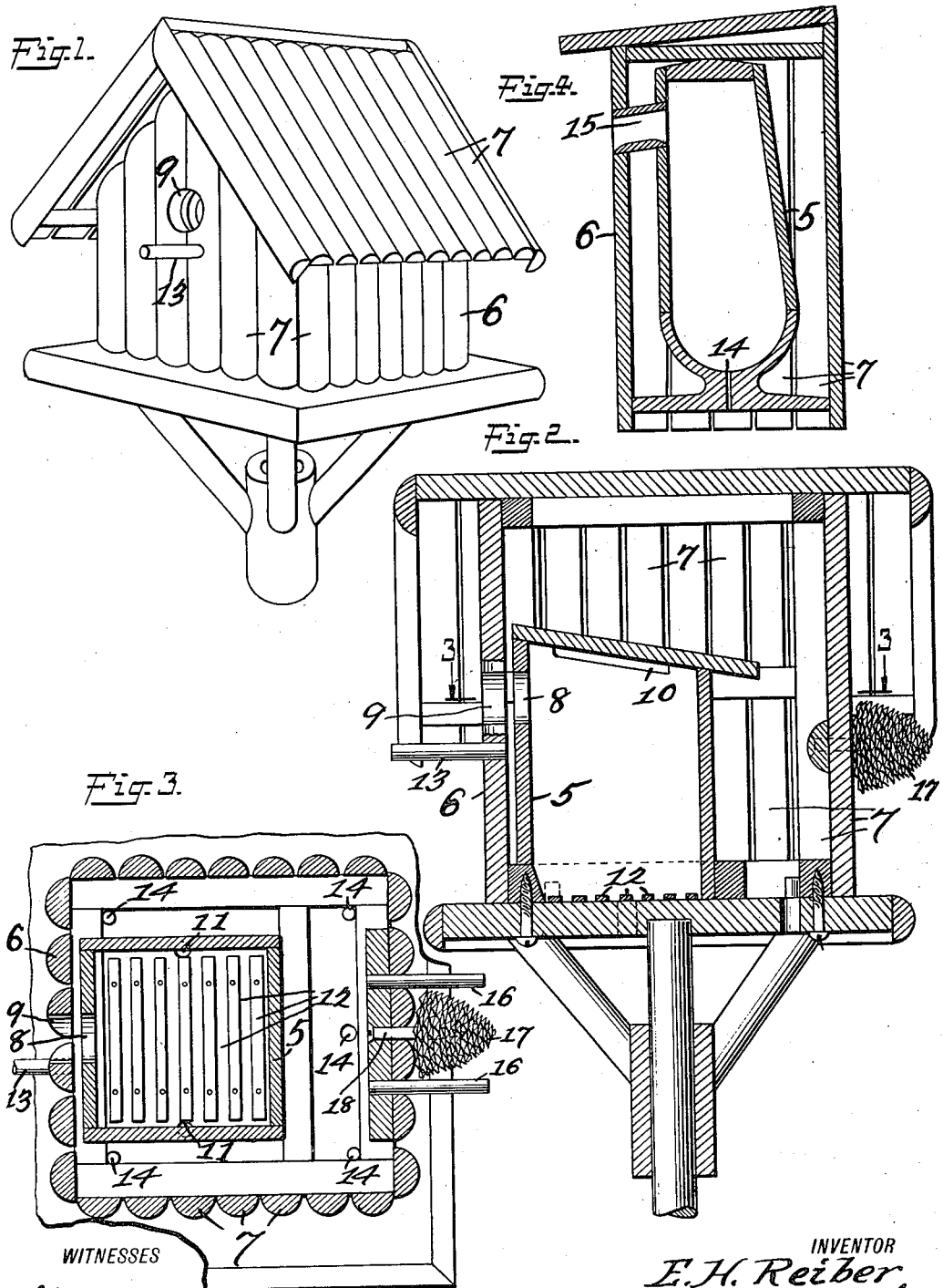

EDWIN H. REIBER, OF WEST WEBSTER, NEW YORK.

BIRD-HOUSE.

1,185,345.  Specification of Letters Patent.  Patented May 30, 1916.

Application filed January 13, 1916. Serial No. 71,882.

*To all whom it may concern:*

Be it known that I, EDWIN H. REIBER, a citizen of the United States, and a resident of West Webster, in the county of Monroe and State of New York, have invented certain new and useful Improvements in Bird-Houses, of which the following is a specification.

My invention relates to birds of the house nesting kinds and is based upon many years of study of birds and of experimentation with bird houses, with the result that my invention includes all the necessary conditions for the nesting of birds, for the successful hatching of their young, and for the health of the young birds whereby they may leave the nests in condition to reach perfect maturity.

It is possible to attract only such birds into a man made house as have by nature nested in cavities in trees, and I have shown and will describe houses adapted for blue birds and woodpeckers. In nature the blue bird nests in a deserted woodpecker's nest or in cavities made by woodpeckers. Woodpeckers select a tree limb that is partly decayed or to such an extent that the wood is in a pulpy condition which renders it possible for one of these birds to dig and peck out an entrance which is just large enough for it to get its body through, after which the actual nest cavity is dug. After inspecting a great number of these cavities and carefully measuring them I have found that the entrance, depth, and size of the cavities vary but little, and I have accordingly conformed thereto in the building of my houses.

In my first experimentation I dug out a limb of a tree in accordance with these measurements and formed a house thereof by cutting the limb to a desired length and mounting the same in a garden. Blue birds have nested in these houses and I found that about ninety per cent. of the young birds never left the nests, due, in my opinion, to the fact that many had been overcome by the heat and many died soon after hatching because of the insufficiency of moisture in the houses, and many of the mother birds were driven from the nests because of vermin the accumulation of which was ideally promoted by the heat retaining qualities of the house exposed throughout the day to the sun.

Inasmuch as birds naturally select shady locations for their nests, I have insured shade to the actual nest irrespective of the location of the house itself by the provision of a thoroughly ventilated shell surrounding the nesting box. I have further insured a thorough circulation of air between the nesting box and the shell and have provided suitable drainage for the nesting box. The houses being cool stops the breeding of vermin and I have constructed the house of red cedar and sassafras to still further insure freedom from vermin, and I have formed the shell of bark bearing slabs for the reason that the bark is a non-conductor of heat.

My invention is fully described in the following specification, of which the accompanying drawings form a part, in which like characters refer to like parts in each of the views, and in which:—

Figure 1 is a perspective view of one exterior design of a bird house the interior of which is constructed in accordance with my invention; Fig. 2 is a vertical section therethrough, enlarged, from front to rear; Fig. 3 is a section taken on the line 3—3 of Fig. 2; and Fig. 4 is a sectional view of a modification embodying the same principle as the form shown in the preceding figures.

The house comprises a nesting box 5 arranged within a shell 6 formed of bark covered slabs 7 spaced apart to insure a thorough circulation of air within the shell exteriorly of the box 5, the latter being provided with an ingress 8 in line with an ingress 9 in the shell 6, with ventilating slots 10, with drainage openings 11, and with a flooring of slats 12, and the shell is exteriorly provided with a perch 13 below and to one side of the ingress 9, and with drainage openings 14, Fig. 3.

The invention really consists of a weatherproof box for the nest arranged within a relatively large shell far from weatherproof, and the shell may be made of any desired design to meet various tastes or different surroundings as long as the perfectly cooled, perfectly drained, perfectly protecting, box 5 is contained within the shell and I will, as stated, employ certain woods the vermin repelling effect of which is known.

The form shown in Figs. 1 to 3, inclusive, is adapted for house nesting birds of different species, whereas the form shown in Fig. 4 is especially designed for woodpeckers, the shell being made of sassafras wood, the nesting box walls of thin maple, and the nest roof and bottom of red cedar, the only important distinction being in the fact that the ingress 15 connects directly with the nesting box 5 in the manner of a woodpecker's naturally made nest.

At the rear of the shell 6 I have shown perches 16 arranged adjacent a pine cone 17 detachably held by a screw 18 to said shell, the cone being filled with a prepared food consisting of a mixture of suet, ground nuts, and various seeds such as canary hemp, millet, and rape, and I may also use ground walnuts. These cones are intended as winter food for the birds and also serve to attract birds to the house, and I may provide any desired and suitable substitute therefor.

The shell 6 may, as stated, be made in any design and of any desired wood, preferably with the bark still on, and I may make structural changes over those shown provided that the spirit of the invention is not departed from and that they come within the scope of the appended claims.

Having fully described my invention, what I claim as new, and desire to secure by Letters Patent, is:—

1. A bird house, comprising a shell formed of spaced slabs and provided with an aperture in the side thereof for the passage of a bird, and a box for a nest within said shell and spaced therefrom also provided with an aperture in register with said shell aperture.

2. A bird house, comprising a shell formed of spaced, bark-covered, slabs, and a box for a nest within said shell and spaced therefrom at all sides, said shell and box being apertured for the passage of a bird.

3. A bird house, comprising a shell formed of spaced, bark-covered, slabs of sassafras, and a weather resisting box within said shell and spaced therefrom at all sides formed of red cedar, said shell and box being apertured for the passage of a bird.

In testimony whereof I have signed my name to this specification in the presence of two subscribing witnesses.

EDWIN H. REIBER.

Witnesses:
OSCAR C. REIBER,
ELIZABETH DIETZ.